Jan. 16, 1962 N. C. HUNT 3,016,917
VALVE FOR CONTROLLING PRESSURIZED FLUID
Filed Aug. 24, 1956 3 Sheets-Sheet 3
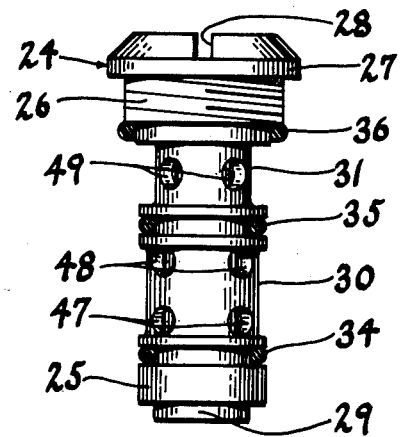
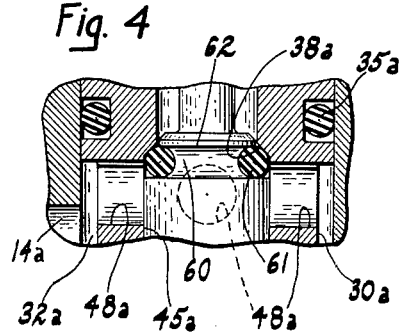
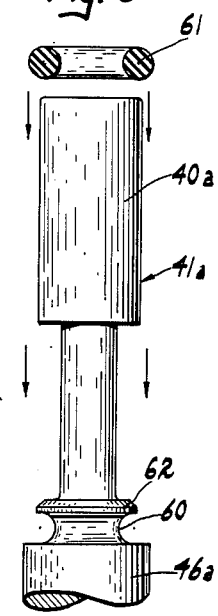
INVENTOR.
NATHAN C. HUNT
BY
Attorney

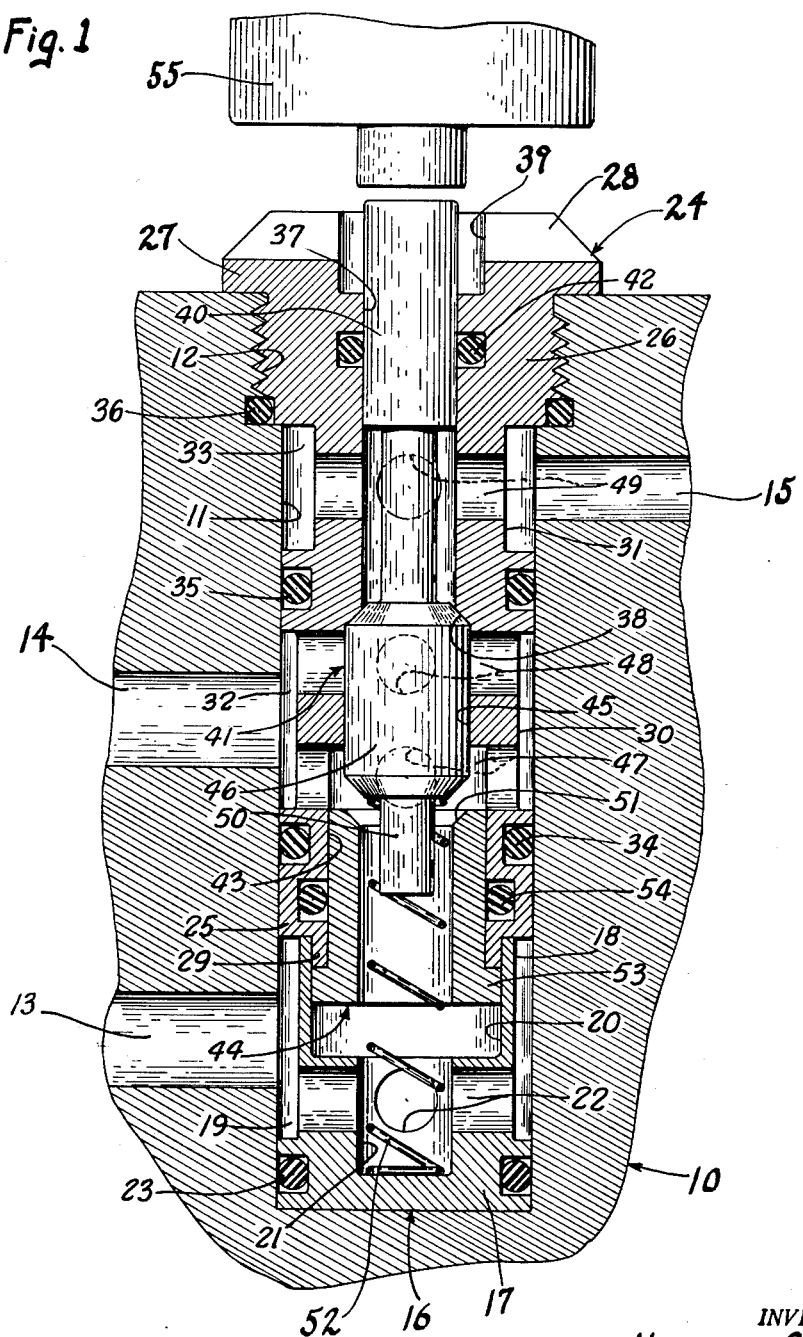

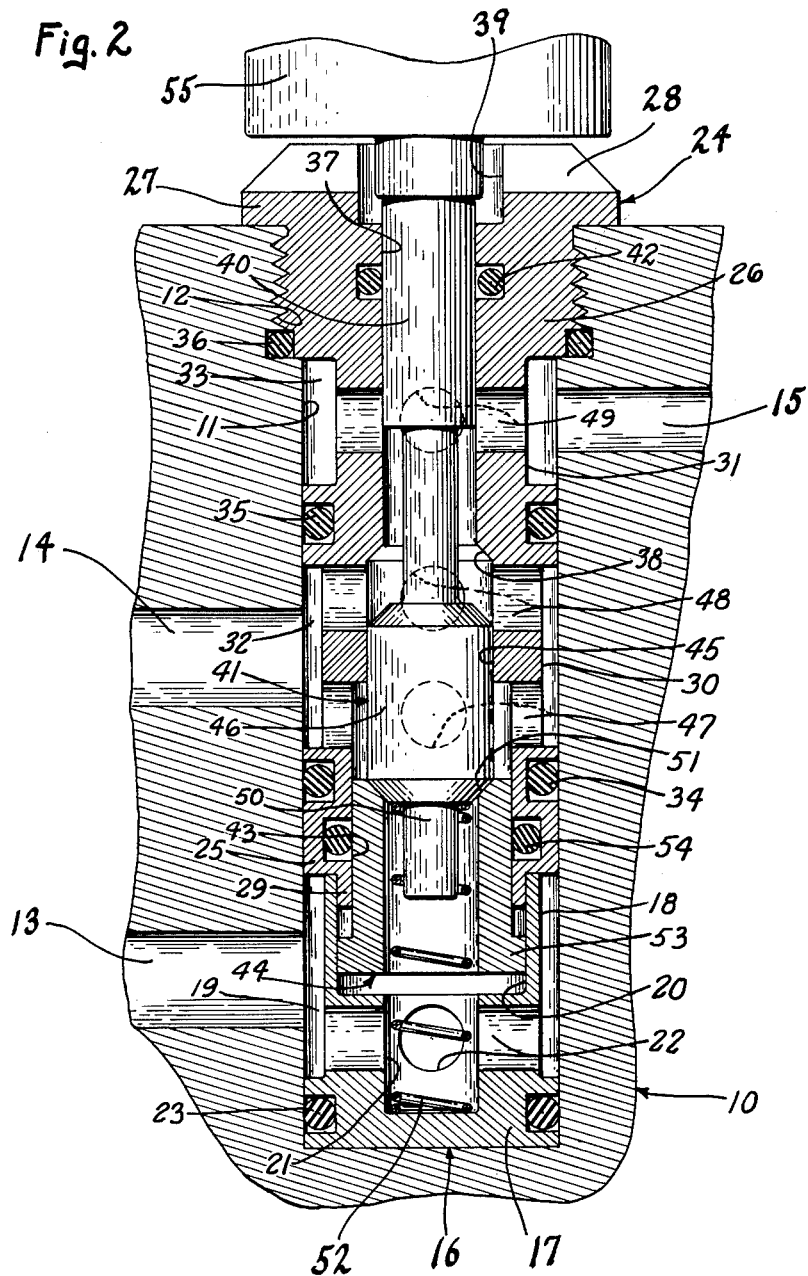

United States Patent Office 3,016,917
Patented Jan. 16, 1962

3,016,917
VALVE FOR CONTROLLING PRESSURIZED FLUID
Nathan C. Hunt, Salem, Ohio, assignor, by mesne assignments, to International Basic Economy Corporation, New York, N.Y., a corporation of New York
Filed Aug. 24, 1956, Ser. No. 606,165
3 Claims. (Cl. 137—620)

The present invention relates to a valve for controlling flow of fluid under pressure; and, the principal object of the invention is to provide new and improved valves of this character. This application is a continuation-in-part of my previously filed application, now abandoned, entitled "Fluid Valve," filed January 12, 1956, Serial Number 558,729.

In valves of the type wherein a pair of members having complementarily formed seat portions are urged together to block flow of fluid, it is necessary to urge the members together with sufficient force to block such flow. However, the force employed in urging the members together should be only that necessary to just cut off the flow, any force in excess of this amount merely causing the seat portions of the members to wear excessively. Any excess force is particularly damaging when valves having relatively small seats are used since, in these applications, the unit pressure on the seats becomes quite high.

Heretofore, valves have been devised which utilize a predetermined force to urge the members together. In many cases, this is effected by employing a spring or like device to limit the force to a predetermined value. This is satisfactory to a degree; however, if the valve is used for lower pressures, the force holding the members together is greater than needed and if used for higher pressures, the force is insufficient to completely block off flow.

The present invention provides a valve having seat members which are urged together with a force which is proportional to the pressure of the fluid being controlled. Other advantages will become apparent from a study of the following description and from the drawings appended hereto.

In the drawings accompanying this specification and forming a part of this application, there is shown, for purpose of illustration, an embodiment which the invention may assume; and, in these drawings:

FIGURE 1 is a longitudinal sectional view through a valve constructed in accordance with the present invention, FIGURE 2 is a view similar to FIGURE 1, but showing certain parts in another position, FIGURE 3 is a reduced size exploded view showing certain other parts in section and certain other parts in elevation, FIGURE 4 is a fragmentary sectional view showing a slightly modified form of my invention, and FIGURE 5 is a view of parts of the construction shown in FIGURE 4, the parts being in separated relation.

The valve of the present invention comprises a housing 10 having a bore 11 entering from one side of the housing. The bore is enlarged adjacent its entrance and provides threads 12 for a purpose to be disclosed. Intersecting bore 11, in the present embodiment, are passages 13, 14 and 15 which are herein respectively designated as an inlet, an outlet and an exhaust.

Positioned in the bottom of bore 11 is a cup member 16 which has a portion 17 of a size to closely fit within the bore and a reduced diameter portion 18 which cooperates with the adjoining portion of the bore to provide an annular space 19 therebetween. A bore 20 is provided in the end of member 16 opposite portion 17 and a recess 21 extends beyond the termination of bore 20 to a point adjacent the end of the member. Extending transversely through cup member 16 are passages 22 which place the interior of the cup member in communication with its exterior. Portion 17 of the cup member 16 is provided with an annular groove in which a suitable sealing ring 23 is positioned.

Positioned above cup member 16 (in the relation of parts shown) is an elongated body 24 having a portion 25 proportioned to closely fit within bore 11. Body 24 has an enlarged portion 26 threaded for engagement with threads 12 formed in housing 10 and the upper terminal portion of body 24 is presently provided with a radial enlargement which provides a head 27 for seating against the exterior of the housing. A transverse slot 28 is formed in the upper portion of head 27 to receive a screwdriver or like tool for installing and/or removing the body.

The lower terminal end of body 24 is reduced in diameter at 29 to closely fit within bore 20 of cup member 16; and, portion 25 of the body is provided with spaced annular grooves 30 and 31 which cooperate with adjoining portions of bore 11 to provide respective annular spaces 32, 33 adjacent respective passages 14, 15. A further annular groove is provided on each side of groove 30 for receiving respective sealing rings 34, 35. A further sealing ring 36 is positioned adjacent the mouth of bore 11, suitable grooves being provided by the housing 10 and body 24 to receive such ring.

With reference to the position of parts shown, a bore 37 extends downwardly from the upper end of body 24 and terminates in a valve seat 38. The entrance end of bore 37 is enlarged at 39 and the bore is of a size to slidably fit with the stem 40 of a valve plunger 41. An internal annular groove is formed in portion 26 of the body to receive a sealing ring 42.

The lower end of body 24 is provided with a bore 43 in which a sleeve 44 is slidable. Bore 43 is reduced in diameter at 45 to slidably fit with and provide a guide for an enlarged body portion 46 of valve plunger 41. Extending transversely of body 24 are passages 47 which place annular space 32 in communication with bore 43. Similar passages 48 are disposed above passages 47 for a purpose to become clear. Extending transversely of body 24 are passages 49 which place bore 37 in communication with annular space 33.

Valve plunger 41 comprises the above-mentioned stem 40, the enlarged body portion 46, and a reduced diameter axial extension 50. The upper terminal portion of enlarged body portion 46 of the valve plunger is formed for a complementary fit with seat 38 provided by elongated body 24 and the lower terminal portion of body portion 46 is formed in a similar manner to fit with a valve seat 51 provided by the upper end of the previously mentioned sleeve 44. It will be seen that bore portion 45 provides a guide for the valve plunger portion 46 intermediate its ends. This insures that the valve plunger will not become misaligned with the respective seats.

A relatively light compression spring 52 surrounds axial extension 50 and is interposed between body portion 46 of valve plunger 41 and the bottom of recess 21 of cup member 16 to resiliently urge the valve plunger to engagement with seat 38 of the elongated body 24.

Sleeve 44 has a central bore through which spring 52 passes and the lower end of the sleeve is provided with a radial enlargement 53 which slidably fits with bore 20 of cup member 16. Enlargement 53 provides a shoulder which, in the position of parts shown in FIGURE 1, engages the end of enlarged body 24 to limit upward movement of the sleeve. A sealing ring 54 surrounds sleeve 44 and engages with the exterior thereof, the ring being seated in a suitable annular groove formed in the adjoining portion of body 24.

The present valve is adapted to be solenoid operated;

accordingly, a solenoid plunger, or core, 55 is shown in FIGURES 1 and 2 positioned above the upper end of stem 40 of valve plunger 41. Although not shown, core 55 will be encased in the usual solenoid construction which actuates the core when the solenoid is energized. For the purpose of the present disclosure, it will be assumed that the solenoid of which core 55 is a part is de-energized in the position of parts shown in FIGURE 1 and that the core is biased to this position by means of a suitable spring or the like (not shown). Upon energization of the solenoid, core 55 will be moved downwardly to the full extent of its stroke as shown in FIGURE 2.

In the herein disclosed embodiment, inlet passage 13 is connected to a suitable source of fluid pressure, outlet passage 14 is connected to a fluid motor (not shown) or like device, and exhaust passage 15 is connected for communication with the atmosphere in the event the fluid being controlled is air. In the event the controlled fluid is a liquid, it will be understood that exhaust passage 15 could be connected with a suitable sump to permit recirculation of the exhausted liquid.

In the position of parts shown in FIGURE 1, fluid may flow from inlet passage 13 to annular space 19, from space 19 through passages 22 to the interior of the cup member 16, upwardly through the interior of sleeve 44, through passages 47 to annular space 32 and thence to outlet passage 14. Note that sleeve 44 will be maintained in the uppermost position shown because its lower enlargement provides a greater area of exposure to the fluid than does the upper end of the sleeve. Since the fluid pressure will be equal on both ends of the sleeve, a greater force will be exerted on the greater area at the bottom of the sleeve than on the lesser area at the top of the sleeve. Further, the friction of sealing ring 54 will tend to hold the sleeve in its uppermost position and prevent its descent under the influence of gravity even though there is no pressure within the valve.

It is an important feature of the present invention that, although the pressure exerted by spring 52 is nominal, the spring serving primarily to prevent chattering of valve plunger 41, the valve plunger will be tightly forced against seat 38 by virtue of the pressure of the fluid below the plunger. Accordingly, the higher the pressure of the fluid being controlled, the greater will be the force which seats the valve plunger against seat 38.

When the solenoid (not shown) is energized, core 55 will move to the full extent of its stroke to the position shown in FIGURE 2. This will shift valve plunger 41 downwardly against the nominal force exerted by spring 52. This movement of the valve plunger will move its enlarged body portion 46 away from seat 38 and into engagement with seat 51 of sleeve 44. The sleeve will be moved downwardly by the valve plunger, as shown, away from the lower end of the elongated body 24. This will permit fluid to escape from outlet 14 to exhaust 15 through annular space 32, through passages 48, past seat 38 into bore 37 and through passages 49 to annular space 33. Flow from inlet passage 13 will be blocked since the valve plunger is seated against sleeve 44.

Note that since the lower end of sleeve 44 is exposed to inlet pressure, seat 51 of the sleeve will be forced upwardly by such pressure against valve plunger 41. Accordingly, the higher the inlet pressure, the greater will be the force which holds seat 51 against the valve plunger. It will be understood that the force exerted by the solenoid has no relation with the force holding valve plunger 41 against seat 51. It is only necessary that the solenoid have sufficient force to move the valve plunger down against the pressure of the fluid. Any excess force exerted by the solenoid will not be transmitted to the valve to cause damage or rapid wear thereof.

When the solenoid is de-energized, a suitable spring or the like (not shown) will bias core 55 from the position shown in FIGURE 2 to the position shown in FIGURE 1. Sleeve 44 and valve plunger 41 will be forced upwardly by inlet pressure until movement of the sleeve is stopped by engagement of the latter with the lower end of elongated body 24. Movement of plunger 41, under the influence of inlet pressure and also under the nominal force exerted by spring 52, will continue until the plunger is once again positioned on seat 38.

As previously mentioned, one of the features of the invention is that the force holding valve plunger and each of the seats together is proportional to the pressure of the fluid being controlled. Accordingly, the valve may be used to control widely varying pressures without adjustments of any kind.

It is another important feature that the valve construction herein disclosed is self-compensating for wear. It will be readily apparent that a material amount of wear of either of the seats 38, 51 or wear of the complementarily formed portions of the valve plunger can occur without affecting operations of the valve.

Attention is particularly directed to FIGURE 2, wherein is disclosed a small ring-like space defined annularly by the inner wall of the portion 18 of cup member 16 and the adjacent exterior surface of sleeve 44, and defined longitudinally by the upper surface of enlargement 53 of sleeve 44 and the lower terminal surface of part 29 of body 24. This ring-like space varies from the size shown in FIGURE 2 to practically nothing, as shown in FIGURE 1, wherein fluid is substantially excluded therefrom.

As the valve parts move from position shown in FIGURE 1 to position shown in FIGURE 2, the ring-like space is created and fluid is drawn into such space. Because the enlargement 53 fits somewhat closely with the inner wall of portion 18 of cup member 16, the admission of fluid to the ring-like space is at a restricted rate and thus the ring-like space acts as a snubber or dash-pot to prevent rapid relative movement of cup member 16 and sleeve 44. Because of leakage between fitting surfaces of cup member 16 and sleeve 44, fluid will fill the ring-like space in a relatively short order so that the valve parts may assume the position shown in FIGURE 2 without objectionable delay.

When the valve parts are moved from the position shown in FIGURE 2 to the position shown in FIGURE 1, fluid is expelled from the ring-like space because the latter diminishes in size. The expulsion of fluid is at a restricted rate because of the fairly close fit of the cooperating surfaces forming the space, and therefore a snubber or dash-pot action is set up to restrict rapid relative movement of the cup member 16 and the sleeve 44. The sealing ring 54 seals against flow of fluid upwardly therebeyond and thus the escape of fluid from the ring-like space will be limited to the interfitting surfaces defining such space. Fluid will be expelled from the space in a relatively short order so that the valve parts may change position without objectionable delay.

In many instances the metal-to-metal engagement between valve enlargement 46 and seat 38 is sufficient to adequately seal against leakage of fluid pressure. However, to insure against any possibility of leakage, such as may be caused by an accumulation of foreign matter on either or both cooperating surfaces of the enlargement 46 and the seal 38, a resilient means is preferably interposed therebetween.

Referring particularly to FIGURES 4 and 5, the embodiment therein disclosed incorporates structure hereinbefore described and similar parts will be given like reference numerals with the suffix "a" added in the to-be described embodiment.

The valve plunger 41a is fragmentarily shown in FIGURES 4 and 5 and, in this instance, is provided with an annular groove 60 at the upper part of the enlargement 46a which in the previously described embodiment sealed against the valve seat 36a. An O-ring 61 of resilient material, such as rubber or a rubber-like product, is sealed in the groove 60 and is adapted to engage the seat 38a when the valve is in the position of parts shown in FIGURE 1.

The O-ring 61 may be easily assembled with the valve plunger 41a by inserting it over the stem 40a, the resilient nature of the ring providing for sufficient stretching thereof to clear the relatively larger diameter of the adjacent stem 40a and the lip 62 overlying the groove 60. The ring 61 will snap into the groove and be firmly held in assembled position by its resiliency.

FIGURE 4 shows the O-ring 61 in sealing relation with the seat 38a. It will be appreciated that the resiliency of the ring will compensate for any irregularities in the seat, such as may be caused by a deposit of foreign matter on the seat, since the peripheral surface of the ring will be distorted by such foreign matter and seal around it. If desired, the lower valve surface of the valve enlargement 46a may also be provided with a sealing ring, such as the ring 61.

The sealing ring 61 (or rings if one is also provided at the lower surface of the enlargement 46a) not only effectively seal against leakage of fluid despite any foreign matter entrained in the fluid stream and/or deposited on the valve seat surfaces, but also eliminates any noise and wear which might be developed by metal-to-metal contact during operation of the valve.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

1. A valve for controlling flow of fluid, comprising means providing a valve bore having a first seat extending transversely of said bore, a valve plunger reciprocable within said bore and having longitudinally spaced portions, one of which is engageable with said first seat to control flow of fluid therethrough, a member reciprocable within said bore and providing a second seat engageable with the other of said longitudinally spaced portions of said valve plunger to control flow of fluid through said second seat, said reciprocable member moving relative to said valve plunger to effect sealing and unsealing relationship, and means in part carried by said reciprocable member and in part carried by said bore producing means and providing a fluid chamber which is varied in size by movement of said reciprocable member and which has a restricted opening for entrance and escape of fluid to thereby yieldably oppose rapid movement of said reciprocable member.

2. A valve for controlling flow of fluid, comprising a housing having a circular elongated recess extending inward from one surface thereof, said housing having three transverse ports spaced longitudinally of said recess and providing fluid inlet and exhaust openings respectively disposed at the inner and outer portions of said recess and a fluid outlet opening intermediate said inlet and exhaust openings, said housing having internal screw threads at the recess opening, valve structure assemblable from said one surface of said housing, comprising a cup member disposed in the inner end of said recess and having an annular skirt wall opening in a direction toward said recess opening, said skirt wall being spaced from the adjacent wall of said recess and having a transverse opening establishing communication between said inlet opening and the interior of said skirt wall, a sleeve member having a headed circular end slidably fitting within said skirt wall and a reduced circular end forming an annular space with said skirt wall, the extremity of said reduced circular end extending outwardly of said skirt wall and being formed with a first valve seat, a round tubular valve body extending into said housing recess and having an externally threaded outer end engaged with the internal screw threads at said recess opening to hold said valve body in position and stationary with said housing, the lower end of said valve body being of an annular tubular size to closely fit within said annular space and having an exterior shoulder bearing against the terminal margin of the skirt wall of said cup member, the inner annular surface of said valve body providing a valve bore of stepped diameters with the larger diameter at its inner end to slidably receive said sleeve member, an intermediate smaller diameter, and a still smaller diameter at the outer end of said valve body, said larger and intermediate diameter bore portions of said valve body having transverse apertures which are spaced longitudinally of said body to respectively establish communication between said valve bore and said outlet opening and said still smaller diameter bore portion having a transverse aperture establishing communication between said bore and said exhaust opening, the shoulder between said smaller and still smaller diameter bore portions providing a second valve seat, a valve plunger reciprocable within said bore, having a head portion slidably fitting within said smaller diameter portion of said bore, a stem portion of smaller diameter than said head portion and slidably fitting within said still smaller diameter portion of said bore, and an intermediate reduced diameter portion, said head portion having valve surfaces at the opposite ends respectively cooperable with said first and second valve seats, and a spring interposed between said cup member and the inner end of said valve plunger.

3. The structure of claim 2 and further comprising an annular groove in the valve surface cooperable with said second valve seat and an O-ring of resilient material within said groove and engageable with said second valve seat.

References Cited in the file of this patent

UNITED STATES PATENTS

| | | |
|---|---|---|
| 948,404 | Webb | Feb. 8, 1910 |
| 2,300,263 | McLeod | Oct. 27, 1942 |
| 2,632,341 | Arp | Mar. 24, 1953 |
| 2,674,266 | Gardner | Apr. 6, 1954 |
| 2,695,035 | Brown | Nov. 23, 1954 |

FOREIGN PATENTS

| | | |
|---|---|---|
| 818,902 | France | June 28, 1937 |